Jan 6, 1931.  I. LUNDGAARD  1,787,584
HOUSEHOLD REFRIGERATOR
Filed April 19, 1926   2 Sheets-Sheet 1

WITNESS

INVENTOR.
IVAR LUNDGAARD
BY
ATTORNEYS.

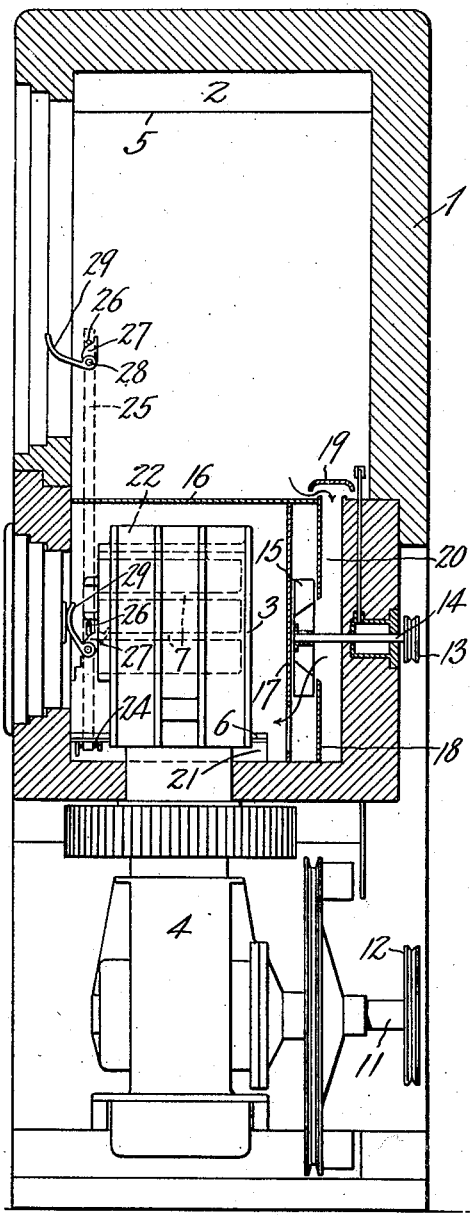
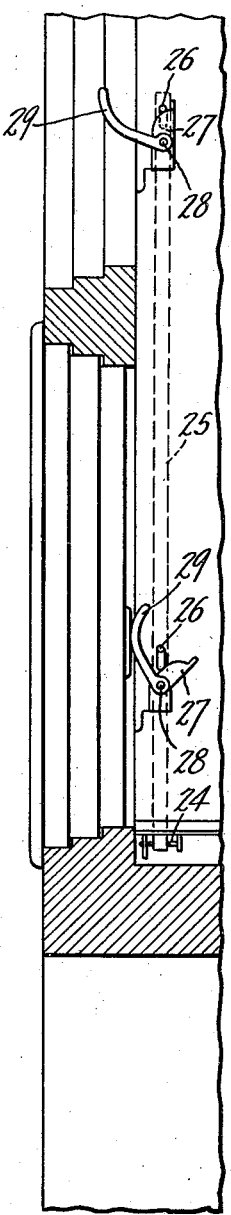
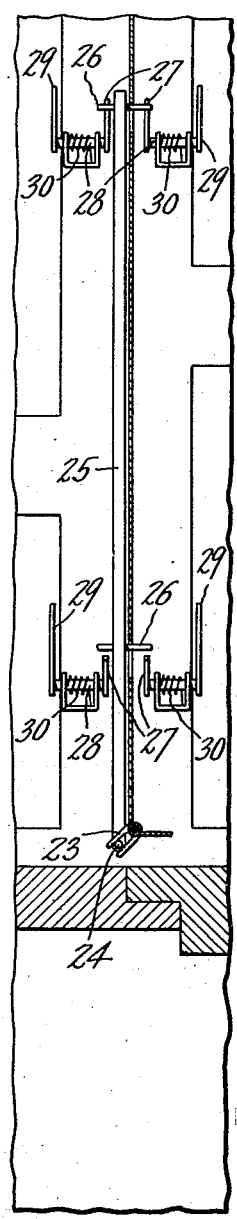

Patented Jan. 6, 1931

1,787,584

UNITED STATES PATENT OFFICE

IVAR LUNDGAARD, OF WEST HARTFORD, CONNECTICUT, ASSIGNOR, BY MESNE ASSIGNMENTS, TO DEVON MANUFACTURING COMPANY, OF BOSTON, MASSACHUSETTS, A CORPORATION OF MASSACHUSETTS

HOUSEHOLD REFRIGERATOR

Application filed April 19, 1926. Serial No. 102,983.

This invention relates more particularly to household refrigerators containing a food compartment and an adjacent compartment for a cooling element of some kind, the said cooling element being under the control of a thermostat located at a suitable point in the refrigerator.

In such refrigerators, a demand exists for maintaining, in the food compartment, a suitable temperature for preserving foods, usually between 40° F. and 45° F; and at the same time maintaining a temperature sufficiently low to rapidly make ice required for table service, and also a sufficiently low temperature to freeze frozen delicacies.

Up to the present time, the usual practice has been to install a cooling element in the ice compartment of an ordinary refrigerator, which cooling element is thermostatically maintained at a temperature sufficiently low to enable ice making and freezing of desserts. Gravity circulation of the cooled air is depended upon to transmit refrigeration from the cooling element to the food compartment, and to aid in this the cooling element is placed in as elevated position as possible with respect to the food compartment. It is evident that with a cooling element maintained at a constant temperature greatly below the temperature desired in the food compartment, the food compartment temperature is varied by the temperature of the room in which the refrigerator is installed and by the amount and character of the service to which the refrigerator is subjected, and that the food compartment temperature cannot be held within close limits of the point desired.

If to maintain a more suitable and constant food compartment temperature, a thermostat is installed in the food compartment, it is possible to maintain desired temperatures here, but with the natural circulation referred to, the temperature of the cooling element must then change according to the demand for the refrigeration of the food compartment and the cooling element temperature will vary greatly and will not for a part of the time be suitable for the various other purposes that it is called upon to serve.

The object of my present invention is to provide means whereby the temperature of the food compartment as well as the cooling element may be held within narrow limits.

To accomplish this I provide a fan or other means for forcing air over the cooling element and through the food compartment, the fan being arranged to operate only when the refrigerating element is working. By this means I am enabled to keep all the air in the two compartments at substantially the same temperature and a thermostat placed anywhere in the refrigerator will easily hold the temperature of this air within narrow limits. A further feature of my invention is the combination with such a forced circulating means of a cooling element located in the lower part of the refrigerator so that any ice that may be formed during the time the machine is running will not be melted during the idle period.

Another feature is the combination with the elements above described of means for augmenting the hold over capacity of the cooling element during the idle time.

Another feature of the invention is a damper arrangement for automatically cutting off the circulation of the air when the doors of the refrigerator are open, with additional means for disconnecting such damper from the automatic control.

The invention is illustrated in the accompanying drawings, in which

Figure 2 is a vertical section at right angles to Figure 1.

Figure 3 is a section through the doors, and

Figure 4 is a front view of the damper operating mechanism.

Figure 1:
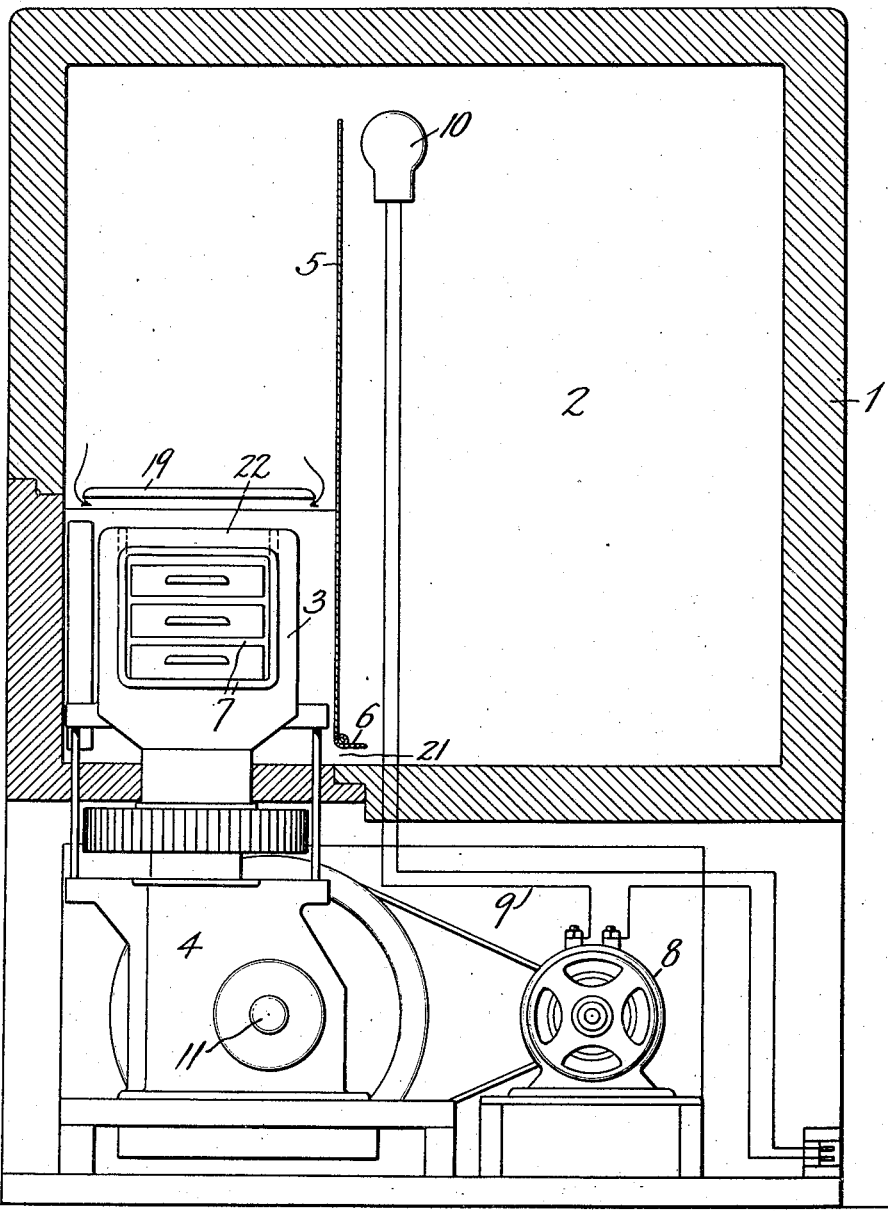
Figure 1 is a vertical section of a refrigerator embodying my improvements.

The refrigerator box 1 has a food compartment 2 adjacent to which is the cooling element 3 of a refrigerating machine 4. A partition 5 may separate a part of the refrigerator enclosing the cooling element from the body of the food compartment. The partition should not extend quite to the top of the compartment and should also have a space between it and the bottom of the compartment, which latter space may be closed by a pivoted damper 6. The cooling element may have shelves 7 for containing trays for making ice. The refrigerating machine is driven by an electric motor 8, the circuit 9 of which is controlled by a thermostat 10 shown in the upper part of the food compartment. On the shaft 11 of the refrigerating machine is a pulley 12 adapted to drive through a suitable belt the pulley 13 upon the shaft 14 of which is mounted a fan 15. The cooling element 3 is enclosed by a box 16, the end walls 17 and 18 of which form a casing for the fan, the fan drawing the air under cap 19 through passage 20 and thence through the fan chamber into the enclosure around the cooling element and thence through an opening 21 at the bottom of the partition 5 (see Figures 1 and 2). It is to be noted that the cooling element is contrary to usual practice, placed adjacent the lower part of the food compartment and that the fan causing circulation of air is driven by the refrigerator machine so that the air is circulated only when the machine is running.

In the top of the cooling element a small reservoir 22 may hold water so as to augment the hold-over capacity of the cooling element. This receptacle will automatically keep itself filled due to condensation of moisture from the refrigerator air and by freezing such water considerable refrigerating capacity may be had for the shut-down period of the machine.

In Figures 3 and 4, I have shown a means of automatically closing the damper 6 when any one of the doors of the refrigerator are opened, the object being, of course, to prevent excessive loss of refrigeration while the refrigerator doors are open. The damper 6 is provided with a slotted lever 23 engaging with which is a transverse pin 24. This pin is secured to a vertically reciprocable rod 25 which in turn has cross pins 26 which rest on rocking cams 27. These cams are mounted on shafts 28 to which are fastened arms 29 adapted to rest against the inside of the doors when closed, being held in contact therewith by springs 30 (see Figure 4). When a refrigerator door is opened, the arm 29 swings outward under the action of the spring. The cam 27 lifts the pin 26 and the rod 25 which closes the damper 6. By this arrangement the construction is such that the rod 25 may be disconnected from the lever 23 by slipping the pin out of the slot of said lever in which case the damper may be closed at will. By this arrangement, it is possible to lower the temperature of the cooling element below that normally maintained so that for special purposes such as making extraordinary large quantities of ice or preparing frozen desserts, a temperature of the cooling element below that usually obtained is available.

Due to the low position of the cooling element and the comparatively restricted areas for passage of air, it is obvious that when the refrigerating machine and, hence, the fan, is not in operation, comparatively little air will circulate over the cooling element, whereas when the machine is in operation, a constant quantity of air is made to circulate over the cooling element and inasmuch as the food compartment is thermostatically controlled, so that the air entering the fan is maintained at a constant temperature, air leaving the cooling element will be cooled a constant amount, depending upon the capacity of the refrigerating machine. By suitably proportioning the superficial area of the cooling element and the amount of forced circulation from the fan, it is possible to maintain the cooling element a fixed number of degrees under that of the temperature of the food compartment as long as the machine is in operation. When the machine shuts down, and circulation ceases, the temperature of the cooling element will not rise greatly and such ice as may have been formed within the cooling element will remain without melting.

Instead of installing the thermostat in the food compartment, it is feasible to install the thermostat in the cooling element compartment if such an arrangement is preferable for practical reasons. Inasmuch as the cooling element, due to the arrangement shown, is maintained a fixed number of degrees below the temperature of the food compartment, that temperature will be closely controlled even though the thermostat is actuated from the temperature of the cooling element.

It is an advantage of this plan that comparatively little heat capacity is required in the cooling element and the usual brine tank resorted to where larger heat capacities are required, is not necessary, and the cooling element made of a casting is perfectly feasible, thereby obviating the greater expense of brine tank construction and corrosive action accompanying the use of low temperature brines.

Due to the use of rapid forced circulation, the superficial area of the cooling element need be only a fraction of the amount necessary where natural circulation is depended upon. A resulting lower cost of manufacture and much greater compactness of the entire refrigerator is obtained, as well as greater uniformity of temperature throughout the food compartment.

It will be seen that the cooling surface, due to its location and relative ineffectiveness when the circulating fan is not in operation, yields very little refrigeration during the shut-down period of the machine. When the machine and the circulating fan is in operation, the cooling surface yields immediately refrigeration at the rate that it is being produced by the machine. Let us assume if the machine has a capacity of 100 lbs. refrigeration, and that with a box temperature of 40° and cooling surface temperature of 20° and room temperature 70°, the machine operates 40% of the time. If room temperature rises to 100° the machine will maintain 40° box temperature with 20° surface temperature, but will run 80% of the time inasmuch as the difference between box temperature and room temperature has doubled and the demand for refrigeration has doubled.

I claim:—

1. A refrigerator comprising a food compartment, a cooling element located adjoining the lower part of the food compartment, said cooling element being provided with at least one compartment for freezing ice, a thermostatically controlled refrigerating machine for keeping the cooling element at a predetermined temperature, a fan for circulating air over the cooling element and into the food compartment, said fan being connected to the refrigerating machine and operable synchronously therewith whereby heat is rapidly conducted from the food compartment to the cooling element while the machine is operating, and whereby melting of ice in said element is avoided when the machine is idle.

2. A refrigerator comprising a food compartment, a cooling element, a refrigerating machine for maintaining the cooling element at a suitably low temperature and a fan for circulating air over the cooling element and into the food compartment, partitions partially separating the food compartment from the cooling element whereby the air is circulated from the lower part of the cooling element to the lower part of the food compartment and from the higher part of the food compartment to the upper part of the cooler element, and a tray located above the cooler element for catching condensed moisture and thereby serving to provide residual refrigeration capacity while the refrigerating machine is idle.

IVAR LUNDGAARD.